Jan. 12, 1926. 1,568,993
R. J. NEWSOM
PIPE FITTING
Filed Oct. 21, 1922

INVENTOR.
Reeves J. Newsom
by Jas. H. Churchill
Atty.

Patented Jan. 12, 1926.

1,568,993

UNITED STATES PATENT OFFICE.

REEVES J. NEWSOM, OF LYNN, MASSACHUSETTS.

PIPE FITTING.

Application filed October 21, 1922. Serial No. 596,134.

*To all whom it may concern:*

Be it known that I, REEVES J. NEWSOM, a citizen of the United States, residing in Lynn, in the county of Essex and State of Massachusetts, have invented an Improvement in Pipe Fittings, of which the following description, in connection with the accompanying drawings, is a specification, like characters on the drawings representing like parts.

This invention relates to a pipe fitting having a relatively non-corrodible metal inner member of novel construction, by means of which an iron or steel or other corrodible metal pipe, which has a protective of cement of like frangible non-metallic lining, may be effectively protected against corrosion.

The fitting referred to is provided with an outer member of iron or steel or other relatively hard metal and with an inner member or lining of lead, zinc or other metal, which is relatively softer than the outer member or the cement lining, and said inner member is provided with an end face for engagement with the outer member of said pipe and with a lip which projects beyond said end face and is made of sufficient length to engage the lining of said pipe so as to make a fluid tight joint therewith, and thereby effectively protect the end of said iron or steel pipe from corrosion, as will be described.

The improved fitting is especially designed to be used with cement lined iron or steel or like pipe which is provided with external screw threads at the end thereof, for it is well known that when a cement lined pipe is externally threaded at its end the iron or steel pipe is elongated at or near its outer circumference by the threading operation and projects beyond the end of the lining. It is also well known that in the case of cement lined pipe, when cut with a pipe cutter, the end of the cement lining is broken down and uncovers more or less of the inner surface of the iron or steel pipe. If such pipes are used with a pipe fitting having a soft metal lining of usual construction, the soft metal lining would not contact with the lining of the pipe so as to effectively protect the latter from corrosion.

To accomplish this result, I have provided the soft metal lining of the fitting with a projecting lip at or near its inner circumference, which lip may be cylindrical in form or beveled, as will be described, and which is designed to engage the cement lining of the iron or steel pipe to make a tight joint therewith, which prevents fluid within the lined pipe from reaching the corrodible member thereof.

The particular features of the invention will be pointed out in the claims at the end of this specification.

Figure 1:
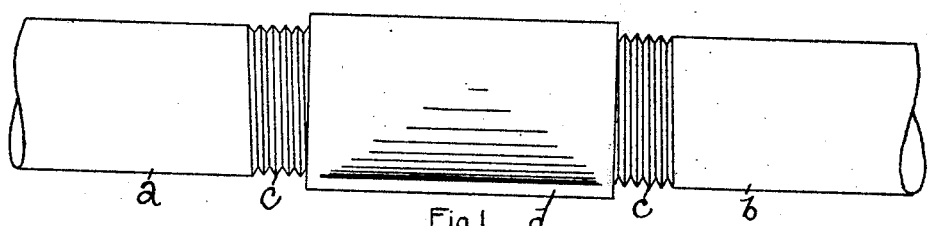

Fig. 1 represents in elevation two lined pipes coupled by a fitting embodying this invention.

Figure 2:
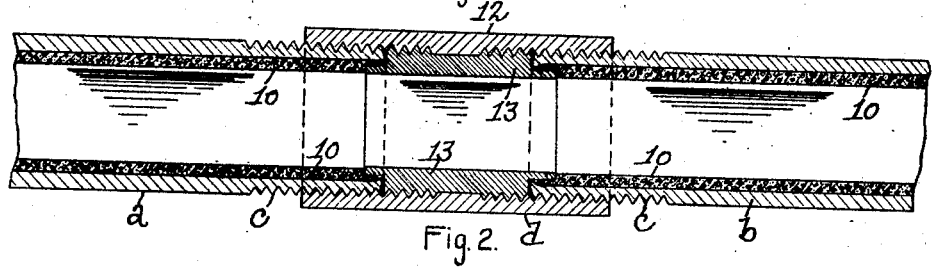

Fig. 2, a longitudinal section of the pipes and fitting shown in Fig. 1.

Figure 3:
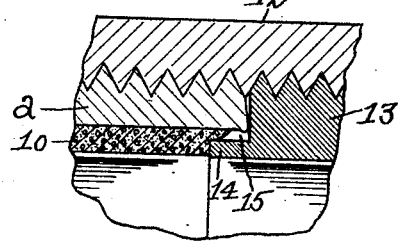

Fig. 3, a detail on an enlarged scale of a portion of the fitting and one of the pipes shown in Fig. 2.

Figure 4:
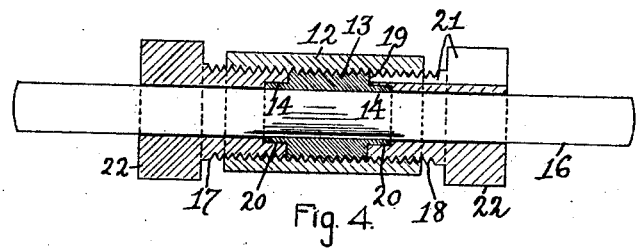

Fig. 4, a longitudinal section of an apparatus for making the fitting shown in Figs. 1, 2 and 3.

Figure 5:
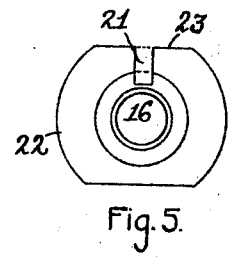

Fig. 5, an end view of Fig. 4 looking toward the left.

Figures 6, 7:
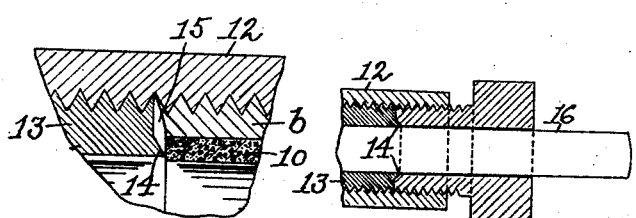

Fig. 6, a modified form of apparatus to be referred to, and

Fig. 7, an enlarged section of a portion of the fitting shown in Fig. 6 and of a lined pipe cooperating therewith.

Referring to the drawing, $a$, $b$, represent two cut sections of a cement lined pipe, which are provided with external screw threads $c$. The pipes $a$, $b$, may be of iron or steel or other relatively corrodible metal, and each is provided with a lining 10 of non-metallic material, such as cement or a composition of cement.

In some cases, the cement lined pipes are cut with a saw and in other cases with a pipe cutter to form shorter lengths or sections of pipe. When a metal pipe having a lining 10 of cement is cut with a pipe cutter, the metal pipe of each cut section is provided with a beveled end, and the lining 10 thereof is broken away or shattered after the manner represented in Figs. 2 and 3, which exposes the inner surface of the end of the cut pipe.

When such cement lined pipe is cut with a saw, each cut section is provided with a square end, and when the metal member of the section cut with the saw is externally threaded, said metal member is elongated more or less and projects beyond the end of the lining, as represented in Fig. 7.

It will be seen that if two sections of cement lined pipe which have been cut and threaded, are coupled by a fitting $d$ comprising a corrodible relatively hard outer member 12 of iron or steel and internally threaded, and a non-corrodible inner member 13, such as lead, zinc or like so-called non-corrodible metal which are softer than the cement lining 10, the end of the lining of the fitting would be engaged with the end of the iron or steel pipe which projects beyond the cement lining 10 and would prevent the cement lining 13 of the fitting being engaged with the cement lining 10 of the pipe, so that in such case, the inner surface of the projecting end portion of the iron or steel pipe would be unprotected and exposed to corrosion.

To overcome this objectionable feature, the lining 13 of the fitting is constructed so as to provide for engagement with both members of the lined pipe, and to this end, the lining of the fitting $d$ is provided near its inner circumference with a projecting portion or lip 14 which projects beyond the portion of the end face of the lining 13 adjacent to the outer circumference of the same.

The lip 14 may and preferably will be made cylindrical in form, as shown in Figs. 2 and 3, or in some cases it may be made beveled, as shown in Figs. 6 and 7. The projecting lip 14 in either case is designed to be made long enough to engage the cement lining 10 of the pipe and be compressed thereby to form therewith a fluid tight joint, which, as shown in Figs. 2 and 3, effectively protects the projecting end portion of the iron pipe formed by the pipe cutting tool, not shown, and also the inner surface of the portion of the iron pipe which is exposed by the breaking off of the cement lining 10 by the said pipe cutting tool.

The lip 14 is designed to engage the cement lining 10 before the connection of the coupling and cement lined pipe is set up, which is the condition represented in Figs. 2 and 3, and when the connection is set up, the metal in the lip 14 will be squeezed and caused to fill the space 15 previously occupied by the portion of the cement lining broken off by the pipe cutting tool.

The protective lip 14 when made cylindrical as shown in Figs. 2 and 3, may be formed with the apparatus shown in Figs. 4 and 5, which is used to form the soft metal lining 13 within the fitting. The apparatus referred to comprises a center arbor 16 and externally threaded plug members or sleeves 17, 18, which are of the proper diameter to fit the internally threaded metal member 12 of the fitting $d$, and of the proper length to form an annular chamber or space 19 between the metal member 12 and the arbor 16. The plug members or sleeves 17, 18 are provided at their ends with annular recesses 20, which may be cylindrical in form, as shown in Fig. 4, or beveled as in Fig. 6, into which the lead or other soft metal flows, when poured into the chamber 19 through a duct or way 21 formed in one of the sleeves or plug members 17, 18. In the present instance, the duct 21 is formed in the sleeve or plug member 18.

The sleeves or plugs 17, 18 may be provided at their outer ends with heads 22 having straight or flat sides 23, see Fig. 5, to facilitate turning with a wrench.

When the cement lined fitting is to be used with a lined pipe which has been cut with a saw and threaded, the lip 14 is preferably beveled and made shorter than the cylindrical lip, as in such case less metal is required in the lip, to enable it to engage the square faced lining 10 as shown on an enlarged scale in Fig. 7, and to fill the space 15 when the connection is finally set up.

In the present instance, the invention is shown as embodied in a cylindrical fitting which is used as a coupling, but it is not desired to limit the invention to the particular shape or form of the fitting, as it is applicable to all the standard forms of lined fittings used with lined iron or steel pipes.

Claims:

1. The combination with a cement lined pipe having the cement lining thereof broken back from its end, of a fitting connected with said lined pipe and having an outer member of relatively hard metal and an inner member of metal relatively softer than the outer member and lining of the cement lined pipe, said inner member being of substantial thickness and provided at its inner circumference with an end portion extended into the outer member of said cement lined pipe and co-operating with the broken end of the cement lining thereof to be compressed thereby and make a fluid-tight joint with said lining within the outer member of the pipe.

2. The combination with a cement lined pipe having the cement lining thereof broken back from its end, of a fitting connected with said pipe and having an outer member of relatively hard metal and an inner member of metal relatively softer than the cement lining, said inner member being of greater thickness than the harder member of said pipe so as to extend inwardly beyond the inner circumference of said harder member a material distance and provided with a lip projecting from the inner circumference at the end thereof, said lip being capable of extending into the harder member of said pipe and being of substantial length to engage and be compressed by the broken end of the cement lining and make a tight joint therewith within the harder member of said lined pipe, said outer member being constructed internally to permit it to be freely movable over the end of the lined pipe until the latter is engaged with the softer inner member of the fitting irrespective of variations in the engaging surfaces of the pipe and fitting.

3. A pipe fitting for cement lined pipe comprising an outer member of relatively hard metal and an inner member of metal relatively softer than the lining of said pipe and capable of being compressed by said lining, said inner member being of substantial thickness and having at its inner circumference a lip of substantial length to enable the said lip to extend into the harder member of a cement lined pipe having a lining broken back from the end of said pipe and to engage and be compressed by said broken back lining and make a tight joint therewith.

In testimony whereof, I have signed my name to this specification.

REEVES J. NEWSOM.